United States Patent [19]

Willson

[11] Patent Number: 4,693,836

[45] Date of Patent: Sep. 15, 1987

[54] FILTER APPARATUS WITH BYPASS PREVENTION

[75] Inventor: David H. Willson, Farmington Hills, Mich.

[73] Assignee: AMSTED Industries Incorporated, Chicago, Ill.

[21] Appl. No.: 856,406

[22] Filed: Apr. 28, 1986

[51] Int. Cl.$^4$ ........................ B01D 29/02; B01D 33/38
[52] U.S. Cl. ................................... 210/791; 210/805; 210/196; 210/387; 210/406
[58] Field of Search ................ 210/780, 783, 800, 805, 210/196, 247, 387, 400, 401, 406, 456, 519, 526, 416.1, 791

[56] References Cited

U.S. PATENT DOCUMENTS

| | | | |
|---|---|---|---|
| 2,919,806 | 1/1960 | Hock et al. | 210/456 |
| 3,083,831 | 4/1963 | Fowler | 210/387 |
| 3,087,620 | 4/1963 | Hirs | 210/406 |
| 4,079,010 | 3/1978 | Killeen et al. | 210/456 |
| 4,192,747 | 3/1980 | Wykoff | 210/526 |
| 4,396,505 | 8/1983 | Willson et al. | 210/387 |
| 4,514,301 | 4/1985 | Parshall | 210/416.1 |

Primary Examiner—Richard V. Fisher
Assistant Examiner—Linda S. Evans
Attorney, Agent, or Firm—Edward J. Brosius; Charles E. Bouton

[57] ABSTRACT

A filter apparatus and method is provided wherein a tank is adapted to receive unfiltered liquid. An outlet chamber is located adjacent the bottom wall of the filter tank and is separated therefrom by a perforated plate. A filter media is movable across the rear, bottom and front walls of the filter tank and accordingly, unfiltered liquid must pass through the filter media as well before entering the outlet chamber. A chain flight assembly is provided which is movable across the filter media along the rear, bottom and front walls of the filter tank. As the chain flight assembly is continuous, a return path is across the top of the tank above the unfiltered liquid. A baffle plate is provided near the rear wall within the filter tank. This baffle plate extends sideways to near each side wall of the filter tank, upwardly above the level of the unfiltered liquid within the filter tank and downwardly to a point just above the flights of the chain flight assembly above the filter media at the bottom of the filter tank. A spray header is provided to spray filtered liquid between the rear wall of the filter tank and the baffle to prevent unfiltered liquid from bypassing the bottom of the baffle and entering the outlet chamber without passing through the filter media. Another spray header is provided to wash the chain flight assembly while it passes above the filter tank.

9 Claims, 4 Drawing Figures

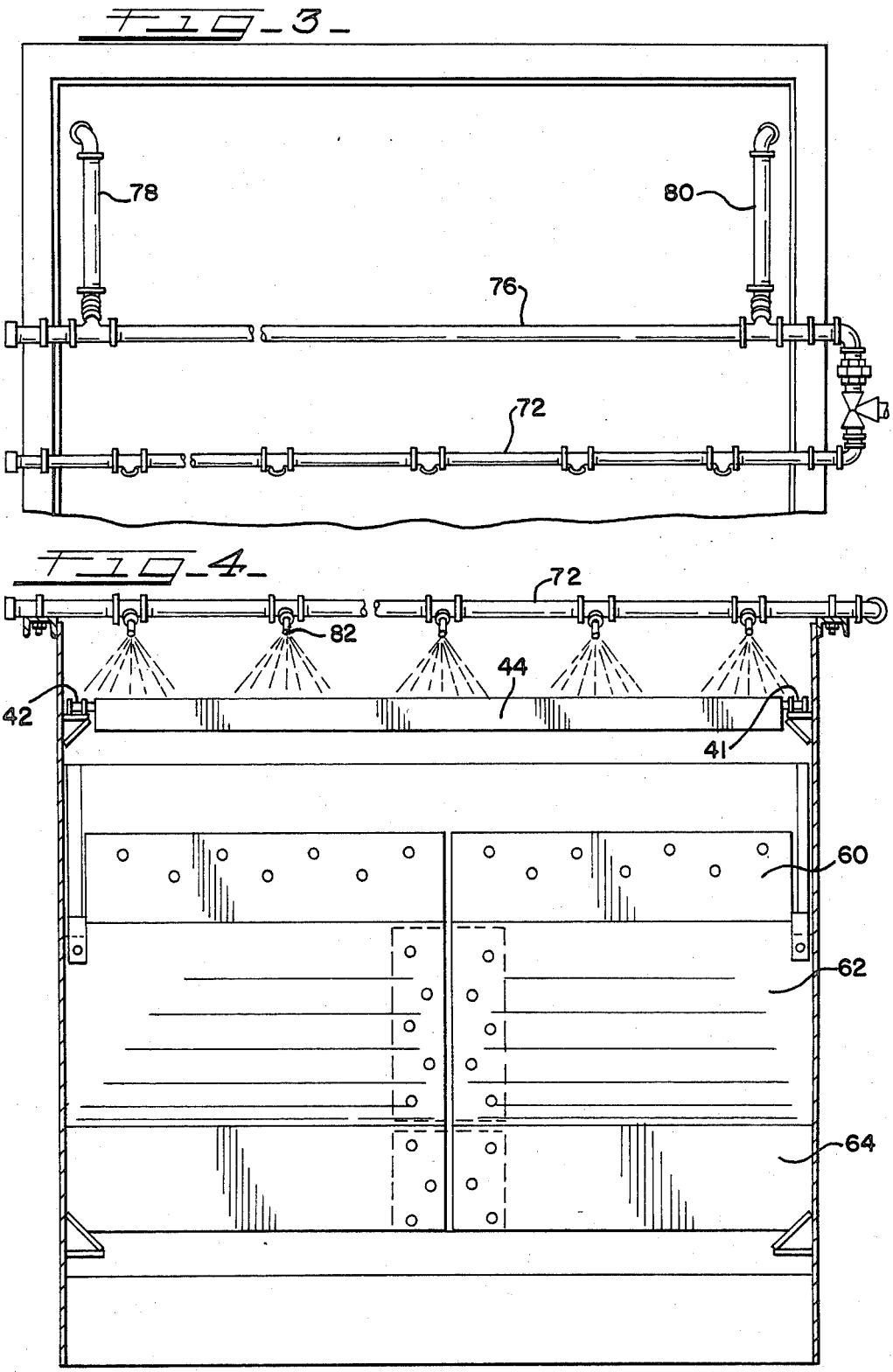

FILTER APPARATUS WITH BYPASS PREVENTION

BACKGROUND OF THE INVENTION

The present invention relates to a filtration apparatus and, more particularly, to an industrial filtration system having a filter tank with a filter media movable along inside walls and the bottom thereof, the filter media separating an outlet chamber from the filter tank.

One type of industrial filtration apparatus or system includes a tank having sloped front, bottom and rear walls joined by side walls to form the tank. An inlet device to supply unfiltered liquid to the filter tank is provided. An outlet chamber or vacuum box is usually located below the filter tank adjacent the bottom wall thereof. The outlet chamber is separated from the bottom wall of the filter tank by a perforated plate. A movable filter media, usually of the replaceable fabric type, is fed into the filter tank, downwardly along the rear wall thereof, along the bottom wall such that any unfiltered liquid must pass through the filter media to enter the outlet chamber, and upwardly along the sloped front wall of the filter tank and outwardly therefrom for disposal of the used filter media. A chain flight assembly is typically provided in such filter devices. The chain flight assembly comprises two endless chain assemblies located adjacent each side wall of the filter tank; the chain assemblies are joined by flights. The chain flight assembly is movable by a drive mechanism inwardly from and adjacent the filter media along the rear, bottom, and sloped front wall of the filter tank. As the chain flight assembly is endless, a return path for the assembly is provided above the unfiltered liquid in the filter tank.

It is possible for such filter devices to operate by gravity wherein the unfiltered liquid passes through the filter media into the outlet chamber without further assistance. However, most typically such filter devices include a pump attached to a discharge from the outlet chamber. Accordingly, a pressure differential can be established across the filter media thereby increasing capacity and flow rate of the filter device. Such a filter device is shown in U.S. Pat. Nos. 3,087,620 and 4,192,747.

One problem with such filtration devices is the tendency for unfiltered liquid to bypass the filter media and enter the outlet chamber without being filtered. This especially occurs at the rear of the filter wherein the filter media and chain flight assembly are traveling vertically downwardly along the rear wall of the filter tank. Such bypassing is believed to occur by the unfiltered liquid going around the edges of the filter media wherein the unfiltered liquid then flows under the media and enters the outlet chamber without flowing through the filter media.

Accordingly, it is an object of the present invention to provide a filter device which prevents unfiltered liquid from bypassing the filter media.

SUMMARY OF THE INVENTION

The present invention provides a filter device of the type including a tank adapted to receive unfiltered liquid, an outlet chamber adjacent the bottom wall of the tank separated by a perforated plate and a movable filter media.

In the filter tank of the present invention, a baffle plate is provided near the rear wall of the tank. This baffle plate extends above the level of unfiltered liquid supplied to the filter tank and downwardly to a point just above the chain flight assembly to allow passage of the filter media and chain flight assembly along the bottom wall of the filter tank. The sides of the baffle plate extend to the side walls of the filter tank itself. Depending on the sprocket assembly configuration for movement of the filter media and chain flight assembly, the baffle plate can take several configurations so long as it is relatively near the rear wall of the filter tank and extends near the bottom and to the side walls of the filter tank.

Further, filtered liquid from the outlet chamber is directed to a spray header located above the chamber formed between the rear wall of the filter tank and the baffle plate. Filtered liquid is sprayed downwardly into this chamber at a rate designed to prevent unfiltered liquid from passing around the baffle plate to thereby work its way under the edges of the filter media and into the outlet chamber without passing through the filter media itself. Such flow of filtered liquid behind the baffle prevents unfiltered liquid from entering the baffle chamber area. The flow of clean filtered liquid introduced behind the baffle causes a continuous flow of clean liquid outwardly from under the baffle plate.

Another spray header is provided above the chain flight assembly as it passes across the top of the filter tank above the unfiltered liquid. Such spray header provides a spray of filtered liquid downwardly onto the chain flight assembly to wash any particles or accumulated materials on the chain flight assembly before it re-enters the liquid in the filter tank.

BRIEF DESCRIPTION OF THE DRAWINGS

In the drawings,

FIG. 3 is a top view of the spray header of the filter device of the present invention; and FIG. 4 is a frontal view of the baffle plate and spray header of the filter device of the present invention.

DESCRIPTION OF THE PREFERRED EMBODIMENT

Figure 1:
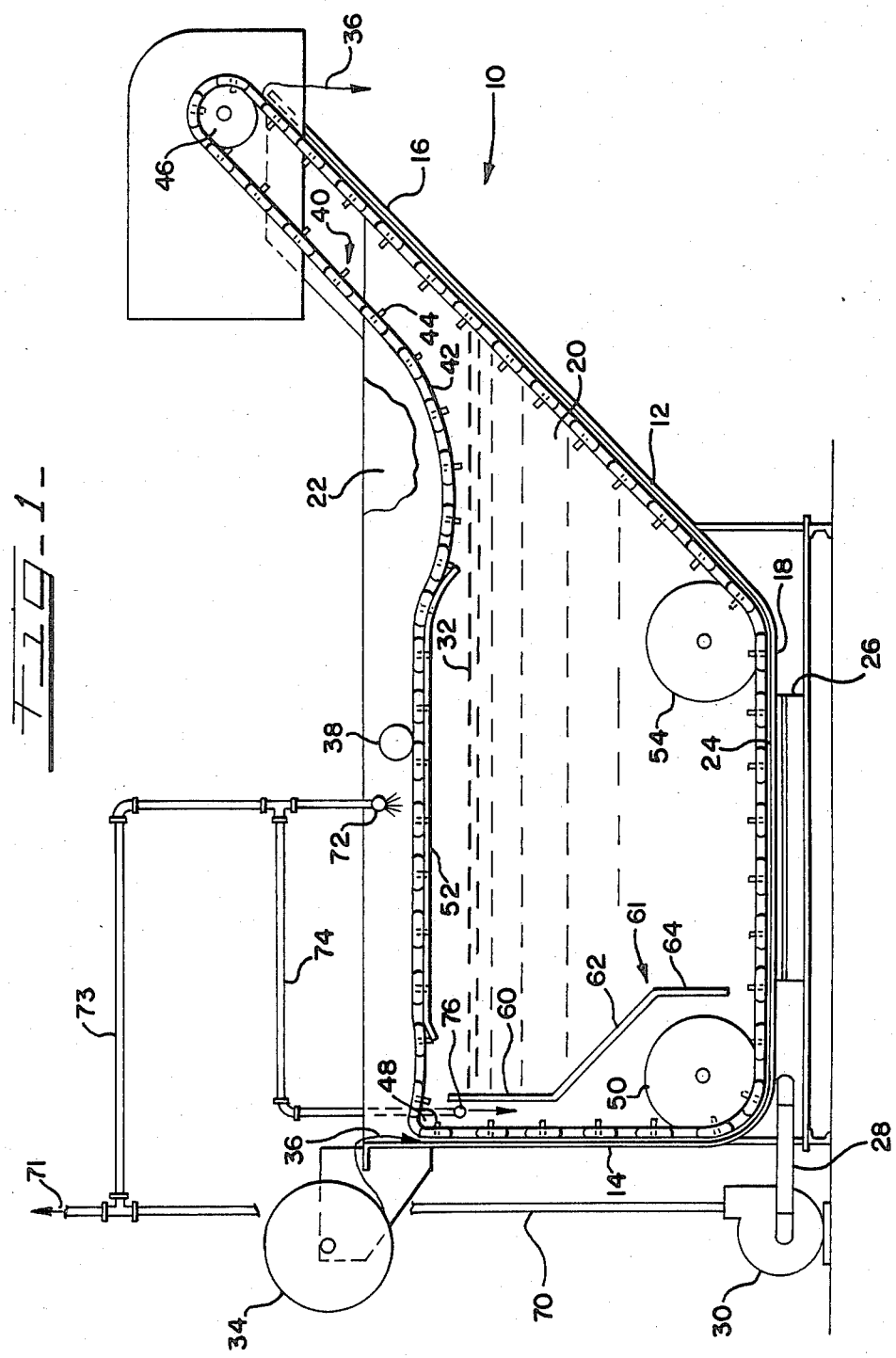
FIG. 1 is a side view, in partial cross section, of a filter device in accordance with the present invention.
Figure 2:
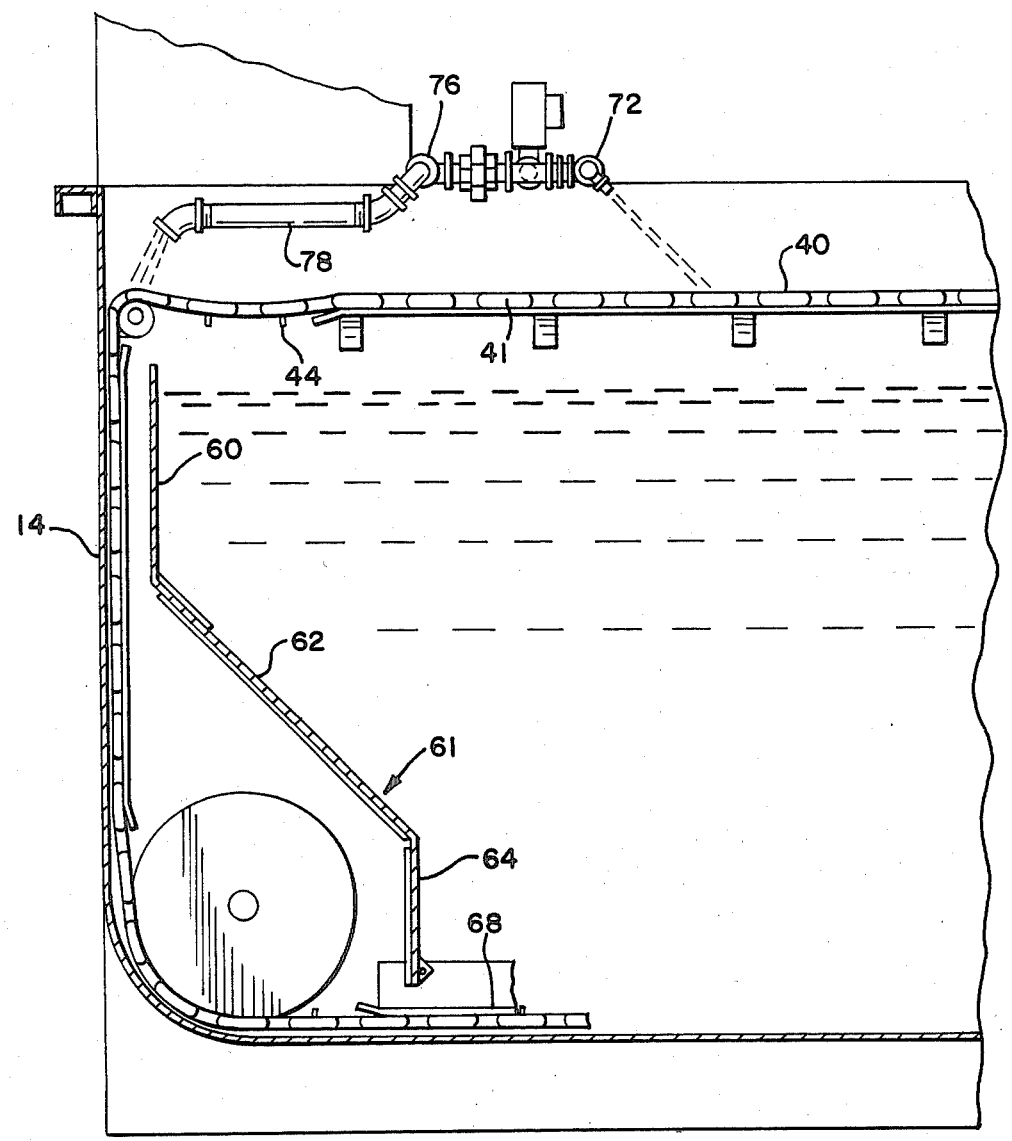
FIG. 2 is a detailed side view in partial cross section of the baffle plate and spray header of the filter device of the present invention.

Referring now to the drawings, a filter apparatus embodying the present invention is shown generally at 10. Filter apparatus 10 comprises filter tank 12 having rear wall 14, sloped front wall 16 and bottom wall 18 with side walls 20 and 22. Side wall 20 includes inlet pipe 38 for liquid to be filtered. Bottom wall 18 includes a perforated plate 24 wherein there is capability for liquid to flow from filter tank 12 into outlet chamber 26. Outlet chamber 26 comprises a box-like structure located below bottom wall 18 of filter tank 12 and is sealed thereto such that outlet line 28 connected to outlet chamber 26, when operatively connected to pump 30, can draw a partial vacuum in outlet chamber 26 thereby creating an effective pressure differential across perforated plate 24. Filter media roll 34 is mounted at the top of filter tank rear wall 14 whereby a porous filter media 36 is fed downwardly along rear wall 14 within filter tank 12, across bottom wall 18 and perforated plate 24 and upwardly along sloped front wall 16 of filter tank 12 whereupon filter media 36 exits filter tank 12 at the top of front wall 16 from which it can be properly disposed of.

A chain flight assembly 40 is provided comprising endless chains 41 and 42 joined by flights 44. Chain flight assembly 40 is driven by drive mechanism 46 in a counterclockwise direction in viewing FIG. 1, downwardly onto chain flight guide 52 onto roller guide 48, downwardly along rear wall 14 of filter tank 12, around roller guide 50 and along bottom wall 18 of filter tank 12, in contact with roller guide 54 and upwardly along front wall 16 of filter tank 12 back to drive roller 46. As chain flight assembly 40 passes along rear wall 14, bottom wall 18 and front wall 16 of filter tank 12, it contacts and acts to maintain filter media 36 against the referenced walls of filter tank 12. This is especially desirable in passing across perforated plate 24 as the chain flight assembly assists in keeping the filter media pressed against the outside edges of bottom wall 18 to ensure the majority of unfiltered liquid 32 must pass through filter media 36 before entering outlet chamber 26. Filter media 36 is typically a paper type media having reinforced edges operatively connected with chains 41 and 42. Upon the passage of a certain amount of unfiltered liquid through filter media 36, a buildup of particulate matter suspended in the unfiltered liquid 32 begins on filter media 36. Such buildup actually aids filtration in that liquid must pass through such buildup and the filter media before entering outlet chamber 26. However, upon the buildup of a substantial amount of filtered materials on filter media 36, the resistance to flow becomes too great and it becomes necessary to move or index filter media 36. This is accomplished by movement of chain flight assembly 40 in order to expose fresh filter media 36 across perforated plate 24 to thereby allow unfiltered liquid to flow through filter media 36 unimpeded by the buildup of filtered material on media 36. Most typically, prior to such indexing of filter media 36 and chain flight assembly 40, pump 30 is shut off in order that the pressure differential across filter media 36 can be decreased. Such pressure decrease facilitates the indexing of filter media 36 across perforated plate 24.

Baffle plate 61 is located within filter tank 12 near rear wall 14. Baffle plate 61 comprises an upper generally rectangular, planar section 60, a middle generally rectangular, planar section 62 extending from upper section 60 at an acute angle about 45 degrees and a lower section 64 extending from middle section 62 downwardly in a manner such that planar sections 60 and 64 are generally parallel. All sections of baffle plate 61 have side edges in close proximity or preferably in contact with side walls 20 and 22 of filter tank 12. Baffle plate 61 is so selected and installed such that top edge of upper section 60 is always above the level of unfiltered liquid in filter tank 12 and the bottom edge of lower section 64 is just above chain flights 44 as they pass beneath lower chain guide 68 along bottom edge 18 of filter tank 12. The contact of the side edges of baffle plate 61 with side walls 20 and 22 of filter tank 12 is typically watertight.

Pump 30 removes filtered liquid from outlet chamber 26 sending the filtered liquid through discharge pipe 70 onward through pipe 71 to be reused in the industrial process. However, a portion of the filtered liquid is returned via pipe 73 to spray header 72 and through pipe 74 to spray header 76. Spray header 72 provides a spray of filtered liquid onto chain flight assembly 40 as it passes beneath spray heads 82 in spray header 72. This spray of filtered liquid acts to remove filtered solids and accumulated buildup from chain flight assembly 40 washing such buildup downwardly into unfiltered liquid 32 in filter tank 12. The spray of filtered liquid from spray header 76 exits through spray head 578 and 80 downwardly behind baffle plate 61 to create a flow of filtered liquid outwardly from the bottom of lower baffle plate 64 and from the sides of baffle plate 61 if any nonwatertight gaps appear at such sides. The main flow beneath lower baffle plate 64 assures that unfiltered liquid cannot enter behind filter media 36 as it passes downwardly along the inside of rear wall 14 of filter tank 12. Such spray of filtered liquid from spray heads 78 and 80, along with baffle plate 61 act to virtually eliminate the bypassing of filter media 36 by unfiltered liquid thereby assuring that any unfiltered liquid must pass through perforated plate 24 and filter media 36 prior to entering outlet chamber 26.

What is claimed is:

1. A filter apparatus comprising
   a filter tank including means defining an inlet through which unfiltered liquid is introduced to the tank,
   means defining an outlet chamber on a lower surface of said filter tank adapted to receive filtered liquid from said filter tank,
   a filter media separating said oulet chamber from said filter tank such that unfiltered liquid passes through said filter media and enters said outlet chamber as filtered liquid,
   means for indexing said media along the lower surface of said filter tank,
   a baffle plate mounted adjacent a rear wall of said filter tank, said baffle having an upper edge which extends above the level of unfiltered liquid in said filter tank, a bottom edge which extends near said filter media and side edges which contact acjacent side walls of said filter tank,
   and a spray header between said baffle plate and the adjacent rear wall of said filter tank to enable filtered liquid to be sprayed between said baffle plate and said rear wall to cause a stream of filtered liquid to pass into said filter tank beneath said baffle.

2. The filter apparatus of claim 1 wherein said baffle plate has a generally rectangular, planar upper section in generally vertical alignment with the adjacent rear wall of the filter tank, a generally rectangular, planar middle section extending from the upper section at an acute angle from the plane of the upper section and a generally rectangular lower section extending from said middle section at an acute angle soas to be in a generally parallel planar alignment with said upper section.

3. The filter apparatus of claim 1 wherein said spray header comprises a supply pipe with a plurality of spray nozzles extending therefrom so as to provide a fairly uniform supply of filtered liquid across the entire width of the baffle plate.

4. The filter apparatus of claim 1 further comprising a chain flight assembly having two continuous chain groups joined by a plurality of flight bars, said chain flight assembly adapted to travel along said filter media as said media passes through said filter tank along rear, bottom and front walls of said filter tank.

5. A method of filtering comprising
   providing a filter tank with unfiltered liquid,
   having an oulet chamber at the bottom of said filter tank, indexing a filter media along said outlet chamber such that such unfiltered liquid must pass through said filter media to exit said filter tank and enter said outlet chamber as filtered liquid, providing a baffle plate within said filter tank near a rear wall of said filter tank, said baffle plate extending from above the level of the unfiltered liquid in said filter tank to near the filter media along the bottom of the filter tank and in contact with each side wall of the filter tank, and providing a spray of filtered liquid between the rear wall of said filter tank and said baffle such that a stream of filtered liquid passes beneath said baffle into said filter tank so as to inhibit unfiltered liquid from passing beneath said baffle from said filter tank and around said filter media into said outlet chamber.

6. The method of claim 5 wherein said filtered liquid is taken from said outlet chamber.

7. A filter apparatus comprising
a filter tank having front, rear, bottom and side walls, and means defining an inlet for unfiltered liquid, means defining an outlet chamber adjacent said bottom wall with a perforated plate therebetween,
a filter media adjacent said front, bottom and rear walls thereby separating said filter tank from said outlet chamber, said unfiltered liquid passing through said filter media and said perforated plate to enter said outlet chamber as filtered liquid,
means for moving said media along said perforated plate,
a baffle plate mounted within said filter tank near said rear wall thereof, said baffle plate extending above the unfiltered liquid level and in contact with said side walls of said filter tank and near said filter media at the bottom wall of said filter tank, and a spray header with a plurality of spray heads to provide a spray of filtered liquid between said rear wall of said filter tank and said baffle plate to cause a stream of filtered liquid to pass beneath said baffle into said filter tank.

8. The filter apparatus of claim 7 wherein said baffle plate comprises an upper section of a generally rectangular, planar configuration, a middle section of a generally rectangular, planar configuration extending from said upper section at an acute angle thereto, and a lower section of a generally rectangular, planar configuration extending from said middle section at an acute angle thereto.

9. The filter apparatus of claim 8 further including a continuous chain flight assembly adapted to index along the rear, bottom and front walls within said filter tank, with said baffle plate extending downwardly to a point near the flights of the chain flight assembly.

* * * * *